United States Patent [19]

Braat et al.

[11] Patent Number: 5,068,751
[45] Date of Patent: Nov. 26, 1991

[54] THREE ELEMENT GRATING OBJECTIVE AND GRATING-BEAM SHAPER, AND OPTICAL SCANNING DEVICE

[75] Inventors: Josephus J. M. Braat; Willem G. Opheij, both of Eindhoven, Netherlands

[73] Assignee: U.S. Philips Corporation, New York, N.Y.

[21] Appl. No.: 570,242

[22] Filed: Aug. 17, 1990

[30] Foreign Application Priority Data

Nov. 2, 1989 [NL] Netherlands ................. 8902706
Dec. 7, 1989 [NL] Netherlands ................. 8903013

[51] Int. Cl.⁵ ............................................. G02B 5/18
[52] U.S. Cl. .................................. 359/566; 359/572; 359/209; 250/237 G
[58] Field of Search ................... 350/6.2, 6.4, 6.9, 6.5, 350/162.11, 162.15, 162.17, 162.20, 162.23; 250/201.5, 204, 237 R, 237 G; 369/32, 44.23

[56] References Cited

U.S. PATENT DOCUMENTS

| | | | |
|---|---|---|---|
| 4,023,033 | 5/1977 | Bricot et al. | 250/201.5 |
| 4,091,281 | 5/1978 | Willhelm et al. | 359/566 |
| 4,771,411 | 9/1988 | Greve | 369/44.23 |
| 4,986,641 | 1/1991 | Bratt | 359/566 |

Primary Examiner—Loha Ben
Attorney, Agent, or Firm—David R. Treacy

[57] ABSTRACT

A grating objective comprises at least three gratings and in which an axial ray and a border ray of a radiation beam are interchanged at least two times so that the objective has a wavelength-independent behavior, a relatively large image field and a satifactorily uniform intensity distribution. A beam shaper and a grating objective with a built-in beam shaper are described based on the same principle.

21 Claims, 4 Drawing Sheets

THREE ELEMENT GRATING OBJECTIVE AND GRATING-BEAM SHAPER, AND OPTICAL SCANNING DEVICE

BACKGROUND OF THE INVENTION

Field of the Invention

The present invention relates to a grating objective having a first and a second diffraction grating arranged one behind the other in the radiation path extending from the object side to the image side. The gratings are adapted and arranged in such a way that a beam ray which is an axial ray or a border ray for one grating is a border ray or an axial ray, respectively, for the other grating. The invention also relates to a beam shaper for reshaping the cross-section of a radiation beam. The invention further relates to an optical scanning device having the grating objective and/or the beam shaper.

A grating objective of the type described above is known from the article "Wavelength independent grating lens system" in "Applied Optics", Vol. 28, no. 4, 1989, pages 682–686. As compared with conventional objective lenses, objectives in the form of gratings or holograms have the advantage that they are smaller and lighter and can be more easily mass-produced by means of known replica techniques. The drawback of a grating used as a lens is that it has a greater wavelength dependence than a conventional lens. At a small variation of the wavelength of the beam, the angle at which the beam portions are diffracted changes, which results in image aberrations.

To reduce the wavelength dependence, this article in "Applied Optics", 1989, pages 682–6 proposes to compose a grating lens from two gratings which are arranged one behind the other. The gratings are adapted in such a way that each ray of a beam is diffracted by the second grating at a second angle which is opposed to a first angle at which this ray is diffracted by the first grating. Consequently, the deviation of the first diffraction angle, caused by a wavelength variation, is compensated by an opposite deviation of the second diffraction angle.

The grating lens described in the article in "Applied Optics", 1989, pages 682–6 is sufficiently achromatic, or wavelengthinvariant, but this grating has a very small image field, for example, with a diameter of the order of 1 $\mu$m. Consequently, this lens is not suitable for certain applications. One of these applications is its use as an objective in a device for scanning an information plane in an optical record carrier. This objective must focus a radiation beam from a radiation source, for example a diode laser such as an AlGaAs laser, to a diffraction-limited radiation spot on an information track in the information plane. This objective must have a relatively large diffraction-limited image field, with a diameter of the order of 100 $\mu$m, or a field angle of the order of 1°. The larger image field is necessary so that the scanning device can be adjusted during its assembly, i.e. to enable the various components to be positioned satisfactorily with respect to each other and to enable the scanning beam to be tilted with respect to the objective during use of the device so that the scanning spot position can be corrected with respect to a track pattern to be scanned in the information plane. As already noted in the article in "Applied Optics", 1989, pages 682–6, the objective described in this article produces a beam having a non-uniform, i.e. a Gaussian intensity distribution.

SUMMARY OF THE INVENTION

In accordance with a first aspect of the present invention a grating objective is provided which is sufficiently achromatic, has a sufficiently large image field and produces a beam with a satisfactorily uniform intensity distribution. This grating objective features at least having a third grating arranged in the radiation path formed by the first and the second grating, so that the axial ray and a border ray of a beam traversing the grating objective are interchanged at least three times.

With the third grating, and possibly subsequent gratings, optical aberrations such as spherical aberrations and coma occurring in the case of larger image fields in a grating objective with two gratings can be compensated, thus obtaining a relatively large diffraction-limited image field. Moreover, the three or more gratings are adapted in such a way that for each ray of the beam the sum of the angles at which a particular ray is diffracted by the successive gratings is substantially equal to zero so that also a variation of this sum resulting from a wavelength variation is negligible. Due to the fact that the border ray and the axial ray are interchanged at least three times, a uniform intensity distribution is achieved.

In principle, the grating objective need only comprise one additional grating, or only a third grating, to comply with the above-mentioned requirements: sufficiently corrected, sufficiently large image field and uniform intensity distribution. A fourth grating may be added to such a grating objective so as to correct for residual errors of the three other gratings. If the specifications which the objective must satisfy are such that more stringent requirements must be imposed on the gratings, with the result that these are more difficult to realize in practice, a fifth grating and possibly further gratings may be used to facilitate the manufacture of all the gratings.

It is to be noted that read units for optical record carriers, in which a third grating is used in addition to a grating pair for forming a scanning spot on the record carrier, are known per se. However, in the conventional read units the third grating is not used together with the grating pair for focusing the scanning beam to a diffraction-limited radiation spot.

For example, in the Japanese Patent Applications laid open to public inspection under publication numbers 63-209029 and 1-30036, a third grating is used for separating the beam reflected by the record carrier from the beam directed towards the record carrier and for splitting the reflected beam into two sub-beams which are directed towards separate detectors.

Japanese Patent Application, publication number 63-291226 describes an optical read apparatus in which three gratings are arranged both in the ongoing path of the scanning beam from the radiation source to the record carrier and in the return path of this beam from the record carrier to the detector. Only two gratings are used as an objective lens in the ongoing path of the beam, while the third grating serves as a collimator and this grating does not change an axial ray of the beam into a border ray, and conversely.

The grating objective according to the invention may be further characterized in that all gratings are transmission gratings.

However, a grating objective according to the invention, comprising a transparent plane-parallel plate having a first surface at the object side and a second surface at the image side and an optical axis perpendicular to the first and second surfaces, is preferably characterized in that the first surface has a radiation window surrounding the optical axis, in that a first grating is reflecting and is arranged on the second surface around the optical axis, in that a second grating is reflecting and is arranged around the radiation window on the first surface and in that a third grating is radiation-transmissive and is arranged on the second surface around the first grating.

This grating objective is extremely compact and is highly suitable for use in small and light-weight devices for playing optical record carriers.

In the current optical scanning devices a semiconductor laser is generally used as a radiation source, which laser has a rectangular exit aperture and emits a beam whose aperture angle in a plane through the beam axis and parallel to the active pn transition layer is smaller, for example, a factor of three, than the aperture angle in a plane through the beam axis and perpendicular to the transition layer. The laser beam then has an elliptical cross-section instead of a circular-symmetrical cross-section. To be able to focus such a beam to a scanning spot having the desired circular shape, a first, or capturing lens, for example, a collimator lens may be used in the optical system, which lens has such a small numerical aperture that it is exactly filled by the beam in the direction of the minor axis of the ellipse of the beam cross-section. In the other direction this lens only accepts a small portion of the radiation energy. It is true that the beam emerging from the capturing lens has a circular-symmetrical beam cross-section, but a much lower intensity than the beam emitted by the diode laser. This radiation loss is particularly objectionable if the scanning device is intended for writing information for which a higher radiation intensity is required than for reading information. The same problem may occur in, for example, optical printers in which one or more diode lasers are used as a radiation source.

It is known to use a beam shaper in the form of a system of prisms, instead of a limiting aperture so as to reshape a beam having an elliptic cross-section to a beam having a circular cross-section. Due to the stringent requirements which must be imposed on a prism of such a system, such a prism is expensive. Moreover, a plurality of prisms in succession are used in practice, which makes the system large and heavy.

In accordance with a second aspect of the present invention a beam shaper is provided which is small and light and moreover is largely independent of wavelength variations and in which the same principle is used as in the grating objective. This shaper is characterized by a system of at least three gratings which are arranged one behind the other in the path of the beam, the gratings being adapted in such a way that the axial ray and the border rays of the beam are interchanged at least three times, while the gratings are one-dimensional gratings.

A one-dimensional grating is a grating which in principle has straight grating lines extending in principle in one direction only. Such a grating only exhibits a grating action in one direction, perpendicular to the direction of the grating lines. The grating system is adapted in such a way that in a plane perpendicular to the grating lines and through the principal axis of the beam the width of the beam leaving the last grating is as large as the width in the plane parallel to the grating lines and through the principal axis, which last-mentioned width does not change when the beam traverses the grating system.

In principle, the number of gratings of the beam shaper may be limited to three, but it may alternatively be larger if more stringent requirements are imposed on the beam shaper. Similarly as in the grating objective, it is also desirable for the grating shaper that border rays and axial rays are interchanged at least three times so as to obtain a uniform intensity distribution.

All the gratings of the beam shaper may be transmission gratings. It is alternatively possible for an even number of gratings to be reflecting. In analogy with the grating objective, a compact beam shaper is then obtained.

The grating objective and the beam shaper may also be combined so that a grating objective with a built-in beam shaper is obtained. Such a grating objective is characterized in that it comprises two-dimensional gratings each having grating periods which are different in two mutually perpendicular directions.

Another object of the invention is to provide a scanning device for optically scanning an information plane, which device comprises a radiation source supplying a scanning beam and an objective system for focusing the scanning beam to a scanning spot in the information plane, which device is small and light and has a relatively large image field and is largely independent of wavelength variations. This device is characterized in that the objective system is constituted by a grating objective as described hereinbefore.

Scanning an information plane is understood to mean both scanning for reading a prerecorded information plane and scanning for writing information in this plane by means of a radiation beam whose intensity is modulated in accordance with the information to be written. In the case of writing a magneto-optical record carrier, the radiation beam may also have a constant intensity and the magnetic field may be modulated in accordance with this information to be written. The information plane may be a plane of an optical record carrier, but also a surface or a face of an object to be tested, the scanning device then forming part of, for example, a microscope.

Finally, the invention has for its object to provide a scanning device comprising a radiation source which produces a scanning beam with an elliptical cross-section, a beam shaper for reshaping the elliptical beam cross-section into a circular beam cross-section and an objective system for focusing the scanning beam to a scanning spot in the information plane, which device produces a scanning spot with a relatively large intensity. This device is characterized in that the beam shaper and the gratings are constituted as described hereinbefore.

Alternatively, this device may be characterized by a grating objective comprising a built-in beam shaper as described hereinbefore.

BRIEF DESCRIPTION OF THE DRAWING

Illustrative embodiments of the invention will now be described in greater detail, by way of example, with reference to the accompanying drawings in which.

DETAILED DESCRIPTION OF THE PREFERRED EMBODIMENTS

Figure 1:
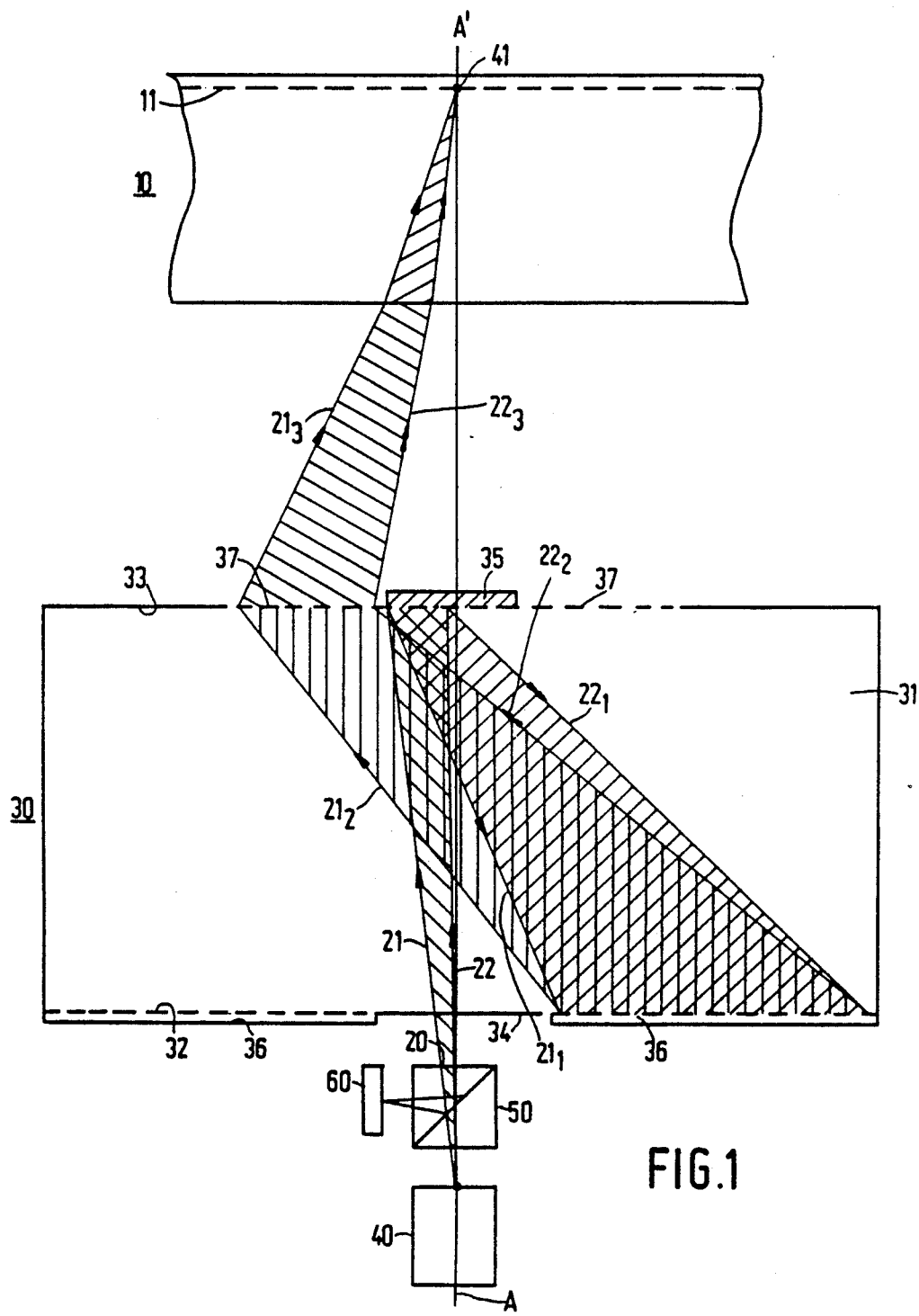
FIGS. 1 and 2 illustrate two illustrative embodiments of an optical scanning device according to the invention.

FIG. 1 shows in a cross-sectional view, a part of an optical record carrier 10 having a reflecting information plane 11. A scanning device comprising a grating objective 30 and a radiation source 40 is arranged proximate to the record carrier. The radiation source 40 emits a scanning beam 20 which is focused to a scanning spot 41 in the information plane 11 by the grating objective 30. The entire information plane can be covered by the scanning spot because the scanning device and the record carrier can be moved with respect to each other, for example, because the record carrier can rotate about a shaft (not shown) perpendicularly to the plane of the record carrier, while the scanning device can be moved radially with respect to the same shaft.

The grating objective 30 is formed by a transparent plane-parallel plate 31 having a first surface 32 facing the radiation source 40 and a second surface 33 at the side of the record carrier. The first surface has a radiation window 34 located centrally around the optical axis AA', through which window the beam 20 enters. The Figure only shows half this beam, limited by an axial ray 22 and a border ray 21.

The beam traverses the plate 31 and is incident on a first reflecting diffraction grating 35 having a circular-symmetrical pattern of grating grooves. The parameters of this grating, such as the grating period, the ratio between the width of the grating strips and those of the intermediate strips, the depth and the shape of the grating grooves, may be chosen to be such that the radiation is predominantly reflected in one diffraction order, for example, the −1 order. The grating 35 and the subsequent gratings 36 and 37 may have varying grating periods.

Due to the different angles at which the border ray 21 and the axial ray 22 are incident on the grating 35 and due to the possibly varying grating period, these rays are diffracted by the grating 35 at different angles and directed as rays $21_1$ and $22_1$ to a second grating 36 which is also reflecting and surrounds the window 34. The ray $21_1$ is incident on the inner edge of the grating 36 so that this ray is, as it were, an axial ray for the annular grating 36. The ray $22_1$ is incident on the outer edge of the grating 36 and is a border ray for this grating. The grating 36 is also formed in such a way that it reflects the radiation mainly in one order, for example, the +1 order. The rays $21_2$ and $22_2$ reflected by the grating 36 are incident on a third transmissive grating 37 which is annular and surrounds the first grating 35. The ray $21_2$ is incident on the outer edge of the grating 37 and the ray $22_2$ is incident on the inner edge of this grating so that, passing from the grating 36 to the grating 37, the axial ray and the border ray are interchanged again. The grating 37 diffracts the radiation for the greater part in one order, for example, the −1 order again, so that the rays $21_3$ and $22_3$ and the intermediate rays are directed towards the optical axis AA' where they meet one another at 41.

The beam half which is not shown traverses an analogous path through the grating objective and its rays also meet at 41.

The grating system 35, 36 and 37 in FIG. 1 is formed in such a way that for each ray of a beam traversing the system the sum of the sines of the diffraction angles, taking the sign of these angles into account, is approximately zero. Then the sum of the deviations of these diffraction angles due to a wavelength variation will also be substantially zero, thus rendering the total grating system independent of the wavelength.

Aberrations which occur in the case of a larger image field in the two-grating system can be corrected by extending a two-grating system to a three-grating system as is shown in FIG. 1. In this case the Abbe sine condition known from the optical handbooks is also satisfied, so that the image field is sufficiently large. This sine condition implies that for a satisfactory image at some distance y' from the axis of an optical imaging system it must hold that: $y \sin \alpha = y' \sin \alpha'$, in which $\alpha$ and $\alpha'$ are the aperture angles of the imaging beam at the object side and the image side, respectively, and y is the distance between a point to be imaged and the optical axis.

When using a grating objective, the effect occurs that the central beam portion is spread by the first grating over a relatively large annular region on the second grating, while the border portion of the beam is concentrated in a small circular region on the second grating. In a two-grating system the second grating does not interchange the central beam portion and the border beam portion so that the emerging beam does not have a uniform intensity distribution. In the grating system according to FIG. 1, using three gratings, the effect is eliminated, due to the extra interchange of the central beam portion and the border beam portion, so that a satisfactorily uniform intensity distribution is obtained.

The grating objective according to FIG. 1 can be extended with further gratings if it might appear under circumstances that the gratings are difficult to make due to the stringent requirements which must be imposed on them. When using a plurality of gratings, the requirements imposed on the separate gratings may be less stringent, which will simplify the manufacture of these gratings. For example, a fourth grating may be arranged behind the grating objective of FIG. 1. It is alternatively possible to replace the grating 37 by a reflecting grating and to arrange a fourth reflecting and annular grating around the grating 36. The fourth grating then reflects the radiation issuing from the grating 37 to the point 41. A fifth grating which is radiation-transmissive and annular may then also be arranged around the grating 37. Under certain circumstances it may be desirable that the border ray and the axial ray are interchanged five times or a lerger odd number of times. Since the extra added fourth, fifth, etc. gratings are considerably weaker than the first three gratings, the number of interchanges may often be an even number in practice.

The gratings are preferably phase gratings because they have a higher efficiency than amplitude gratings. The phase gratings may be profile gratings comprising grating grooves alternating with intermediate strips. It is alternatively possible for the phase gratings to be so-called volume gratings which are formed by a layer composed of strips alternately having a first and a second refractive index.

The gratings may also be formed in such a way that the radiation is mainly diffracted in the second orders or even higher orders instead of in the first orders as described with reference to FIG. 1. With the grating period remaining the same, the diffraction angles can be enlarged then or, with the diffraction angles remaining the same, the grating periods can be increased then.

When scanning a reflecting information surface provided, for example, on the optically readable digital audio discs known under the name of "Compact Disc", the beam reflected in the spot 41 is captured by the grating objective and traverses the reverse path therein towards the radiation window 34. The reflected beam may enter the radiation source and when using a semiconductor laser as a radiation source, it may be detected by this laser. This so-called feedback read-out is described, for example in German Patent Specification no. 1,584,664. However, the common radiation path of the emitted and reflected radiation beams preferably accommodates a beam-separating element, for example, a splitting cube 50 by which a portion of the reflected radiation is separated from the scanning beam 20 and is projected on a radiation-sensitive detection system 60. Since the radiation reflected in the information plane 11 is modulated with the information stored in the information plane and scanned by the radiation spot, the system 60 converts the information flux into an electric signal which is suitable for further processing.

Figure 2:
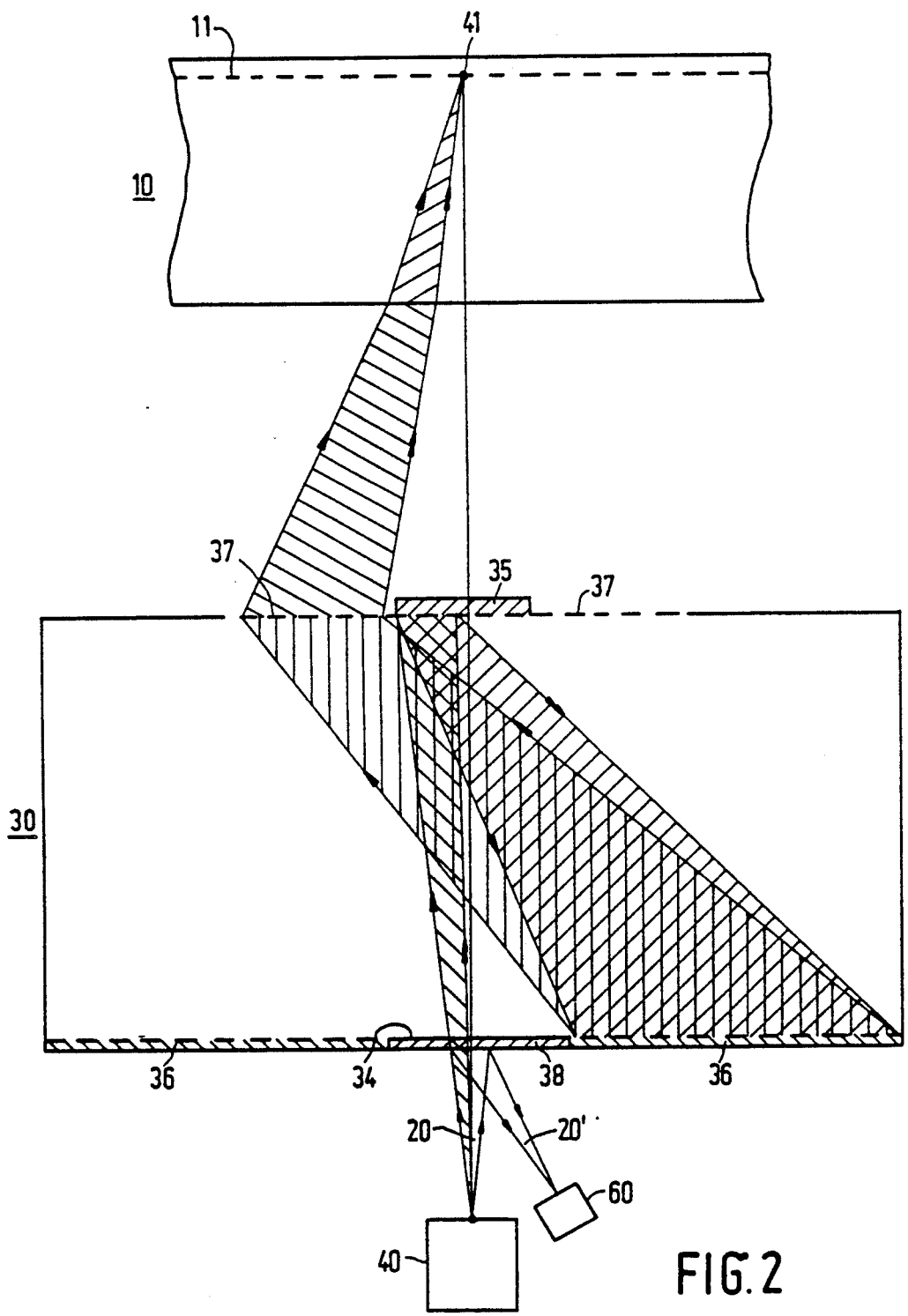

The beam separation may not only be effected by means of a separate element but also by the objective itself, if a coupling-out diffraction grating 38, as shown in FIG. 2 is arranged on the entrance and exit window 34.

This diffraction grating is, for example, a diffraction grating having straight grating strips. This grating splits a beam incident thereon into a non-diffracted zero-order sub-beam and into two diffracted sub-beams of the plus first order and the minus first order and a plurality of sub-beams diffracted in higher orders. The grating parameters, such as the ratio between the width of the grating strips and that of the intermediate grating strips, and in the case of a phase grating, the shape and the depth of the grating grooves may be chosen to be such that the intensity product of the zero-order sub-beam formed upon the first passage through the grating 38 and a first-order sub-beam formed upon the second passage through the grating is maximum. It may be ensured that the first-order sub-beams formed upon the first passage through the grating 38 are diffracted through such an angle that the radiation of these beams, after reflection by the information plane 11, does not reach the detection system 60.

The coupling-out grating 38 may include two grating portions which are distinguished from each other in that they have different grating periods, or different directions of the grating lines, as described in U.S. Pat. No. 4,665,310. The beam returning through the grating objective is then split into two sub-beams. If these sub-beams are incident on two detector pairs, a focus-error signal and possibly a tracking error signal can be generated. It is alternatively possible for the coupling-out grating 38 to be formed in such a way that it renders the returning beam astigmatic. With such a beam, in combination with a detector in the form of a four-quadrant cell, a focus-error signal can also be generated as described in U.S. Pat. No. 4,023,033.

Figure 3:
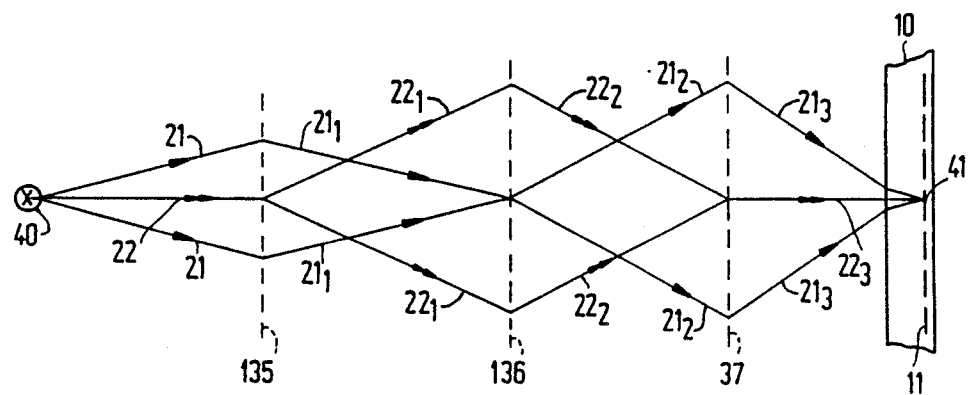
FIG. 3 depicts an illustrative embodiment of such a device with a grating objective composed of transmission gratings.

Although the reflection-grating objective according to FIGS. 1 and 2 is preferred because of its compactness, the grating objective may also be formed with transmission gratings, for example, with three transmission gratings, as is shown in FIG. 3.

In this objective the axial ray 22 is diffracted outwards by the grating 135 so as to reach the grating 136 as border ray $22_1$. This border ray is diffracted inwards by the grating 136 so as to reach the grating 37 as axial ray $22_2$. The grating 37 diffracts the ray once more so that it continues as ray $22_3$ along the optical axis to the point 41. The border ray 21 is diffracted inwards by the grating 135, subsequently diffracted outwards by the grating 136 and finally diffracted inwards again by the grating 37 towards the point 41.

Figure 4:
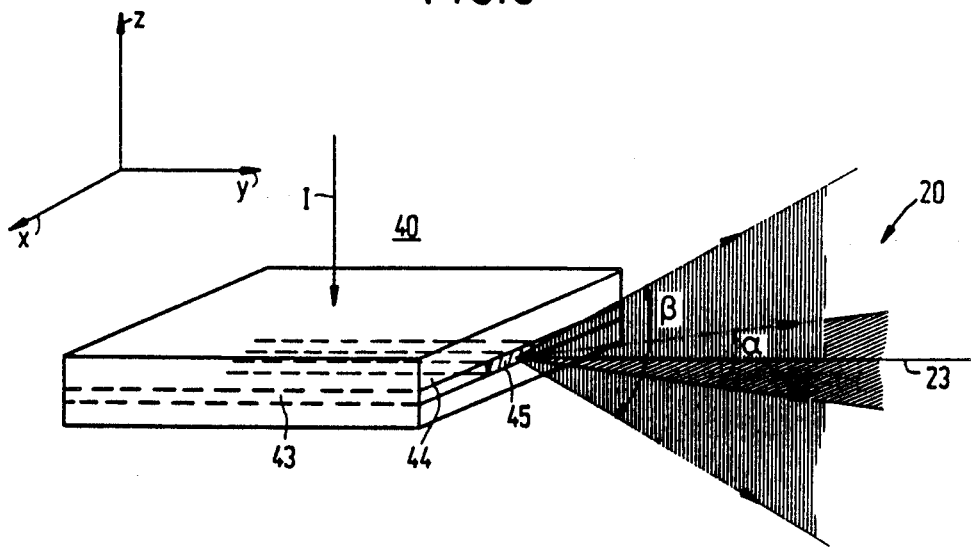
FIG. 4 shows a diode laser which emits a beam having an asymmetrical cross-section.

In modern scanning devices for optical record carriers, but also in, for example, laser printers, a diode laser, for example an AlGaAs diode laser is preferably used as a radiation source. FIG. 4 shows such a laser 40 in a perspective view. This laser comprises a plurality of p and n-type semiconductor layers, inter alia, a so-called active layer 43, in which laser radiation is generated if an electric current I of sufficient power is passed through the diode laser in a direction transverse to the layers. The laser radiation emerges from the active layer at the front side, or front facet, 44, while the principal axis 23 of the laser beam is parallel to this layer. The radiation-emitting surface 45 of the diode laser is rectangular, with the dimension in the direction parallel to the active layer, the so-called lateral direction, being larger than the dimension in the direction transverse to the active layer, the so-called transversal direction. Furthermore, the aperture angle $\alpha$ of the laser beam in the lateral plane is smaller than the aperture angle $\beta$ in the transversal plane. This beam therefore has an elliptic cross-section.

In view of the desired high information density in optical record carriers, the scanning spot formed in the information plane must be circular, must have a minimum diameter and must be diffraction-limited. Such a spot can only be obtained if the beam entering the objective has a circular cross-section with such a diameter that the pupil of the objective is filled satisfactorily. Also for a laser printer it is desirable that the radiation spot formed on the recording medium is circular. For obtaining a diode laser beam with a circular cross-section a so-called beam shaper must be arranged in the path of this beam.

Figure 5A:
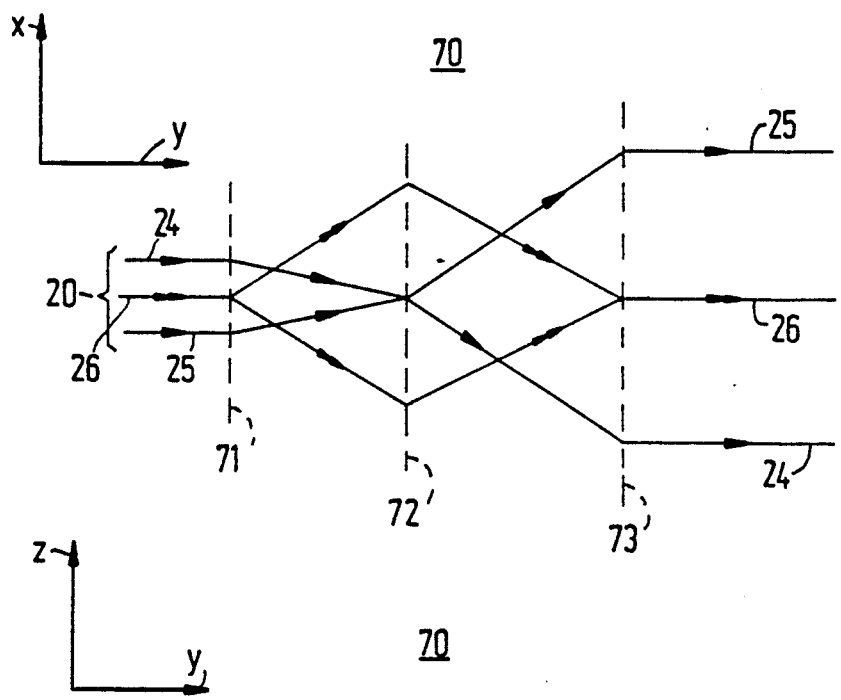
FIGS. 5A and 5B show a beam shaper for reshaping this beam into a beam having a circular-symmetrical cross-section.
Figure 5B:
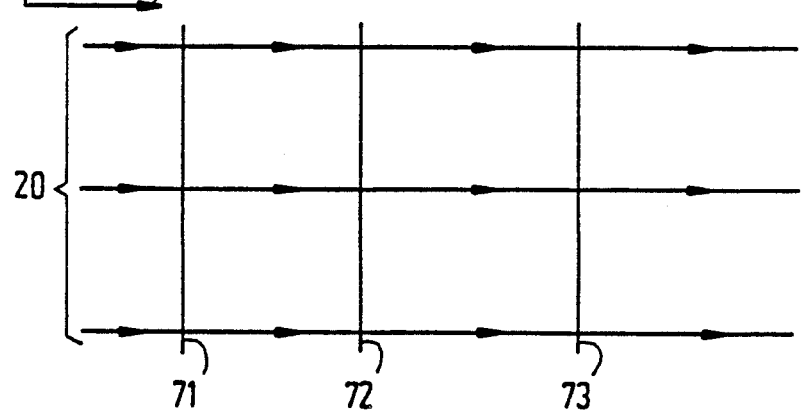

Such a beam shaper may comprise diffraction gratings whereby according to the invention, for example, three one-dimensional gratings are used. The operation of the beam shaper is substantially not influenced by wavelength variations of the laser beam 20. FIG. 5a shows a cross-section of such a beam shaper 70 in a plane perpendicular to the grating lines, while FIG. 5b shows the same beam shaper in a plan view. The grating lines extend in the Z-direction, i.e. perpendicularly to the plane of the drawing in FIG. 5a, and parallel to the plane of the drawing in FIG. 5b and parallel to the lateral plane of the diode laser of FIG. 4.

As is shown in FIG. 5a, the desired widening is obtained in that the axial rays 26 of the beam halves of the incident beam 20 are diffracted away from the axis by the first grating 71. The second grating 72 diffracts these rays towards the optical axis while the third grating 73 gives them the desired direction. The border rays 24 and 25 are firstly diffracted by the grating 71 towards the optical axis and subsequently diffracted away from the optical axis by the grating 72 so as to be finally diffracted in the desired direction by the grating 73.

When the beam traverses the beam shaper, the width of the beam is enlarged in the lateral, or X-Y plane (FIG. 5a) so that this width becomes equal to the width in the transversal, or Y-Z plane (FIG. 5b), which latter width does not change when the beam traverses the beam shaper.

A scanning device comprising a diode laser may be further miniaturised if the beam shaper is built in the grating objective. This can be realized by rendering the optical power of the gratings, represented by the diffraction angles, to be different in the mutually perpendicular directions X and Y. These gratings are then no longer rotationally symmetrical but have different grating periods in the X and Y directions, resulting in different diffraction angles in these directions. The gratings of the grating objective with a built-in beam shaper can be considered as superpositions of the gratings 35, 36 and 37 of the grating objective 30 according to FIGS. 1 and 2 on the gratings 71, 72 and 73 of FIGS. 5a and 5b. In general it is also possible to superpose other gratings on the gratings 35, 36 and 37 of FIGS. 1 and 2, such as a coupling-out grating, a beam-splitting grating, a grating introducing astigmatism, etc.

Furthermore, the diffraction elements of the grating objective and the beam shaper may alternatively be constituted by hologram gratings instead of by gratings in the narrower sense of the word. These hologram gratings are gratings made by means of holographic methods or gratings generated by means of a computer. The concept of grating should thus be understood in a wide sense and comprises all these variants.

Figure 6:
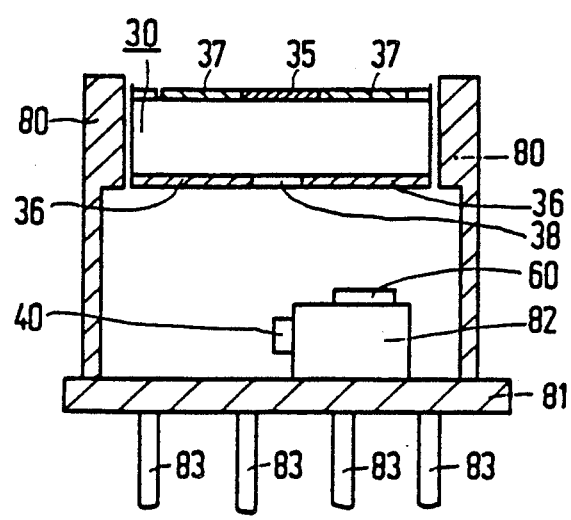
FIG. 6 is a cross-sectional view of an integrated optical read unit comprising a diode laser, a grating objective and a photo diode.

Due to the compactness of notably the reflection grating objective of FIGS. 1 and 2 it is possible to integrate this objective 30 together with the diode laser 40 and the radiation-sensitive detection system 60 in one housing. FIG. 6 shows such an integrated optical read unit in a cross-section. The grating objective 30 with the gratings 35, 36 and 37 and the coupling-out and beam-splitting grating 38 are arranged in a holder 80 which also forms part of the housing. This housing is closed at its lower side by a base plate 81. A cooling block 82 is arranged on this base plate, to which block both the diode laser 40 and the radiation-sensitive detection system in the form of a composite photodiode 60 are secured. The elements 83 are some of the input and output pins for supplying the energizing current to the diode laser and for deriving the signals from the photodiode.

We claim:

1. A grating objective comprising: a first diffraction grating and a second diffraction grating arranged one behind the other in a radiation path extending from an object side to an image side, the gratings being adapted and arranged in such a way that a beam ray which is an axial ray for one grating is a border ray for the other grating and that another beam ray which is a border ray for one grating is an axial ray for the other grating, and at least a third grating arranged in the radiation path formed by the first and the second grating, so that the axial ray and the border ray of a beam traversing the grating objective are interchanged or switched at least two times.

2. A grating objective as claimed in claim 1, characterized in that all gratings are transmission gratings.

3. A grating objective as claimed in claim 2 comprising a built-in beam shaper, characterized in that it comprises two-dimensional gratings each having grating periods which are different in two mutually perpendicular directions.

4. A device for optically scanning an information plane, which device comprises a radiation source supplying a scanning beam and an objective system for focusing the scanning beam to a radiation spot in the information plane, characterized in that the objective system is constituted by a grating objective as claimed in claim 2.

5. A grating objective as claimed in claim 1, comprising a transparent plane-parallel plate having a first surface at the object side and a second surface at the image side and an optical axis perpendicular to the first and second surfaces, the first surface having a radiation window surrounding the optical axis, the first grating being a reflecting grating and arranged on the second grating and arranged around the radiation window on the first surface and the third grating being a radiation-transmissive grating and arranged on the second surface around the first grating.

6. A grating objective as claimed in claim 5 comprising a built-in beam shaper, characterized in that it comprises two-dimensional gratings each having grating periods which are different in two mutually perpendicular directions.

7. A device for optically scanning an information plane, which device comprises a radiation source supplying a scanning beam and an objective system for focusing the scanning beam to a radiation spot in the information plane, characterized in that the objective system is constituted by a grating objective as claimed in claim 5.

8. A grating objective as claimed in claim 1, comprising a built-in beam shaper, characterized in that it comprises two-dimensional gratings each having grating periods which are different in two mutually perpendicular directions.

9. A device for optically scanning an information plane, which device comprises a radiation source supplying a scanning beam having an elliptic cross-section, a beam shaper for reshaping the elliptic beam cross-section to a circular cross-section and an objective system for focusing the scanning beam to a scanning spot in the information plane, characterized by a grating objective comprising a built-in beam shaper as claimed in claim 8.

10. A device as claimed in claim 9, characterized in that an entrance window of the grating objective is provided with a coupling-out grating for diverting radiation returning through the objective from the path of the source radiation.

11. A device as claimed in claim 9, characterized in that the grating objective and a radiation-sensitive detection system are arranged in a housing of the radiation source.

12. A device for optically scanning an information plane, which device comprises a radiation source supplying a scanning beam and an objective system for focusing the scanning beam to a radiation spot in the information plane, characterized in that the objective system is constituted by a grating objective as claimed in claim 1.

13. A device as claimed in claim 12, characterized in that an entrance window of the grating objective is provided with a coupling-out grating for diverting radiation returning through the objective from the path of the source radiation.

14. A device as claimed in claim 13, characterized in that the grating objective and a radiation-sensitive detection system are arranged in a housing of the radiation source.

15. A device as claimed in claim 12, characterized in that the grating objective and a radiation-sensitive detection system are arranged in a housing of the radiation source.

16. A beam shaper for reshaping a beam having an elliptic cross-section to a beam having a circular-symmetrical cross-section, characterized by a system of at least three gratings which are arranged one behind the other in a path of a beam, the gratings being adapted in such a way that an axial ray and a border ray of the beam are interchanged or switched two at least times, while the gratings are one-dimensional gratings.

17. A beam shaper as claimed in claim 16, characterized in that all gratings are transmission gratings.

18. A device for optically scanning an information plane, which device comprises a radiation source supplying a scanning beam having an elliptic cross-section, a beam shaper for reshaping the elliptic beam cross-section to a circular cross-section and an objective system for focusing the scanning beam to a scanning spot in the information plane, characterized by a beam shaper as claimed in claim 17.

19. A beam shaper as claimed in claim 16, characterized in that an even number of gratings is reflecting.

20. A device for optically scanning an information plane, which device comprises a radiation source supplying a scanning beam having an elliptic cross-section, a beam shaper for reshaping the elliptic beam cross-section to a circular cross-section and an objective system for focusing the scanning beam to a scanning spot in the information plane, characterized by a beam shaper as claimed in claim 16.

21. A device for optically scanning an information plane, which device comprises a radiation source supplying a scanning beam having an elliptic cross-section, a beam shaper for reshaping the elliptic beam cross-section to a circular cross-section and an objective system for focusing the scanning beam to a scanning spot in the information plane, characterized by a beam shaper as claimed in claim 16.

* * * * *